Figure 2:
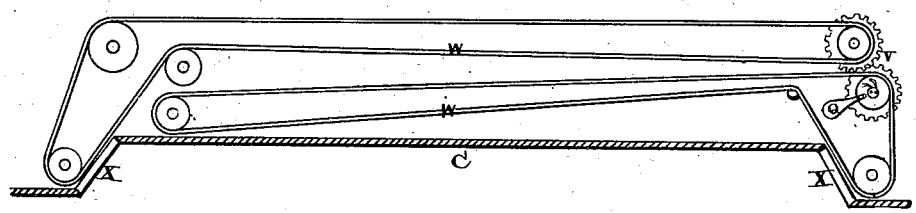

(No Model.)  3 Sheets—Sheet 1.
R. F. BRIDEWELL.
ADVERTISING DEVICE FOR STREET CARS.
No. 256,424.  Patented Apr. 11, 1882.
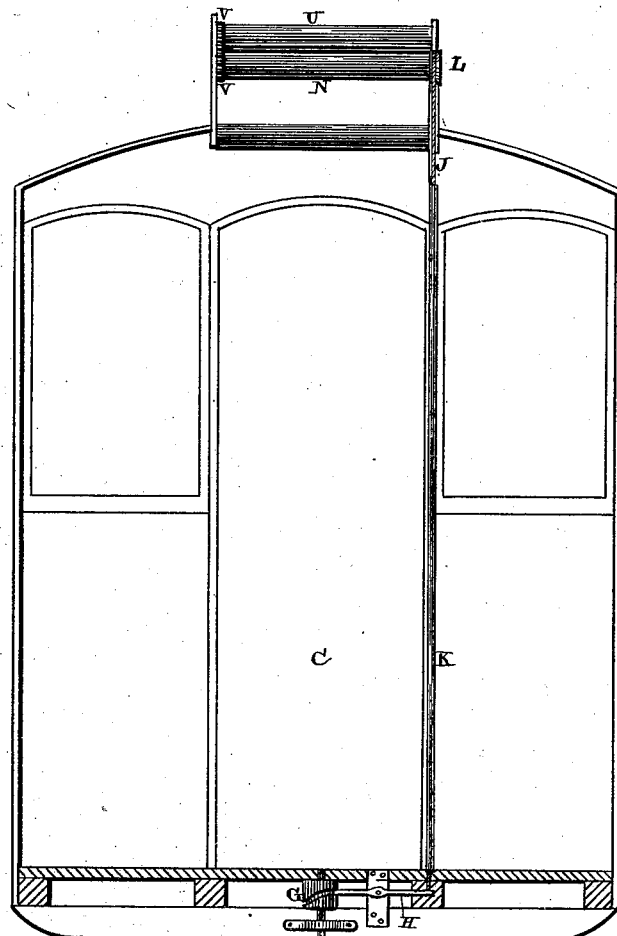
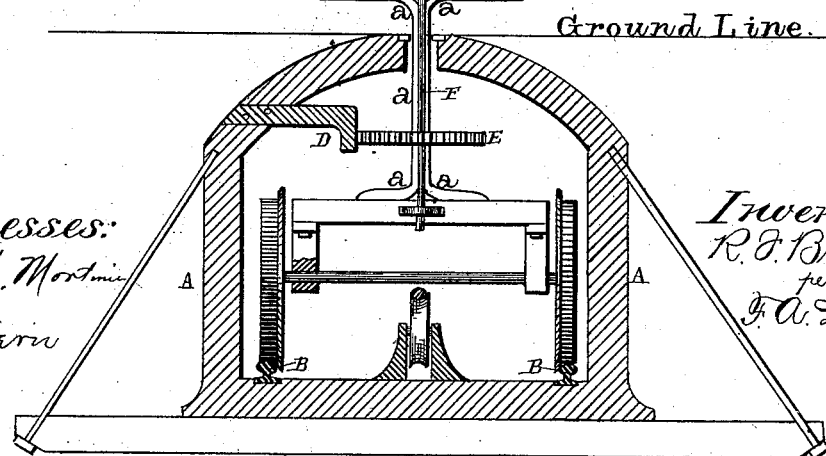

(No Model.)  
3 Sheets—Sheet 2.

R. F. BRIDEWELL.
ADVERTISING DEVICE FOR STREET CARS.

No. 256,424. Patented Apr. 11, 1882.

Witnesses:

Inventor:
R. F. Bridewell
per
F. A. Lehmann
Atty (No Model.)  R. F. BRIDEWELL.  3 Sheets—Sheet 3.
ADVERTISING DEVICE FOR STREET CARS.
No. 256,424.  Patented Apr. 11, 1882.

Witnesses:
Wm. W. Mortimer.
W. F. Kerr.

Inventor:
R. F. Bridewell,
per
F. A. Lehmann,
Att'y

UNITED STATES PATENT OFFICE.

RICHARD F. BRIDEWELL, OF SAN FRANCISCO, CALIFORNIA.

ADVERTISING DEVICE FOR STREET-CARS.

SPECIFICATION forming part of Letters Patent No. 256,424, dated April 11, 1882.

Application filed January 30, 1882. (No model.)

*To all whom it may concern:*

Be it known that I, RICHARD F. BRIDEWELL, of San Francisco, in the county of San Francisco and State of California, have invented certain new and useful Improvements in Advertising Devices for Street-Cars; and I do hereby declare the following to be a full, clear, and exact description of the invention, such as will enable others skilled in the art to which it pertains to make and use it, reference being had to the accompanying drawings, which form part of this specification.

My invention relates to an improvement in combined indicators and advertisers for street-cars; and it consists, first, in the combination of a rack, which is secured to the side of the road-bed, with a toothed wheel placed upon a vertical axle, and a mechanism for operating the endless belts upon which are placed the names of the streets and the advertising-cards; second, in the combination of a pivoted lever, a connecting rope or wire, two rollers which are geared together, a mechanism for causing the rollers to revolve as each street is reached and passed, and the two endless belts upon which the names of the streets and advertising-cards are placed, which belts are operated at the same time and moved in opposite directions; third, a car having an opening through each end, in combination with the belts and a suitable mechanism for operating them, whereby the names of the streets and the advertisements are exhibited at both ends of the cars at the same time; fourth, the combination of a street-car with the belts, a mechanism for operating them, an alarm mechanism, a connecting rod, cord, or wire, a pivoted lever, a grooved cam, vertical shaft, and toothed wheel and rack; fifth, the combination of an operating mechanism, a pivoted lever, a connecting wire, rod, or cord, a loose pulley placed on the end of the roller around which the belt passes, dogs, ratchets, projections, and an alarm mechanism, all of which will be more fully described hereinafter.

The object of my invention is to provide an indicator to announce the names of the streets just before the car has reached them, and then after the street has been crossed to move the endless belts, so as to change from the name of the street to an advertisement, the names of the streets and the advertisements being exposed at both ends of the cars at the same time.

Figure 3:
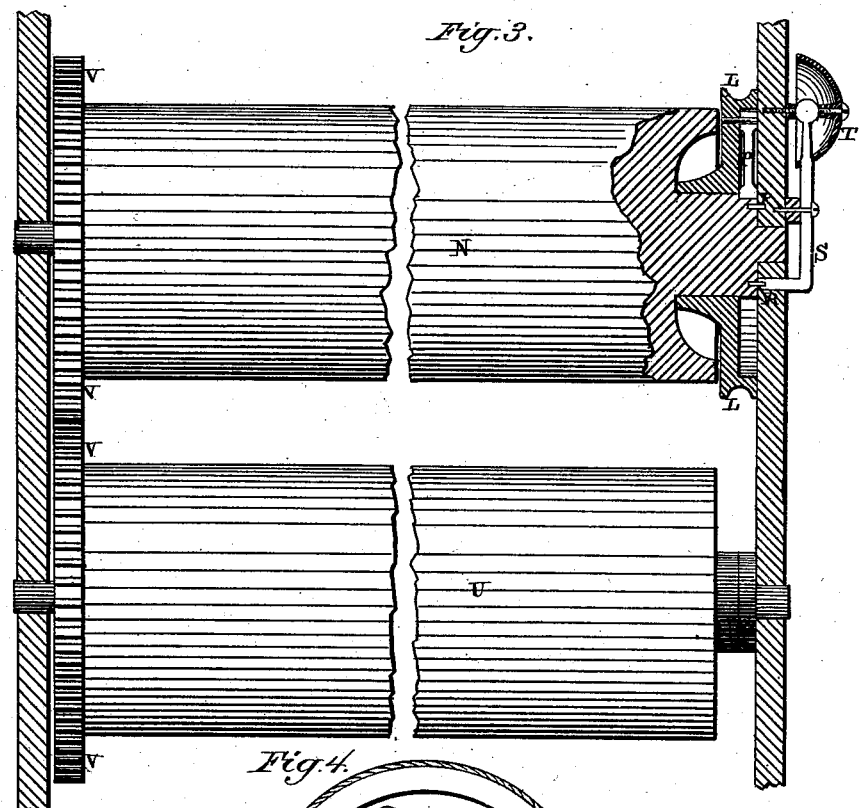
Figure 4:
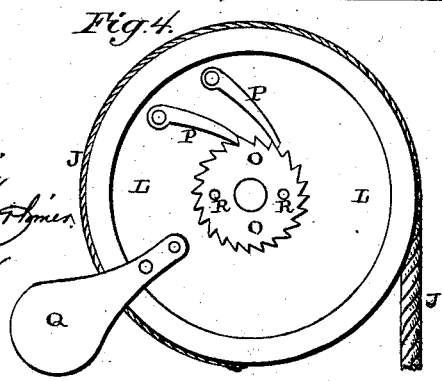
Figure 5:
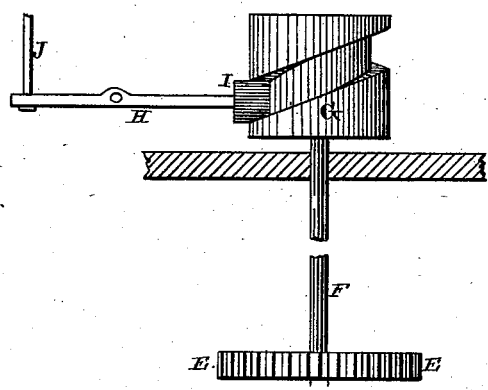
Figure 6:
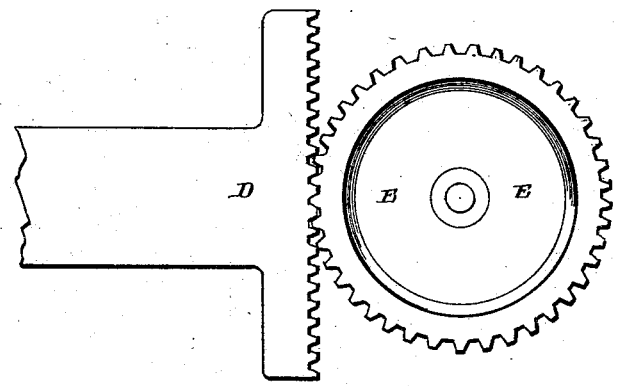
Figure 7:
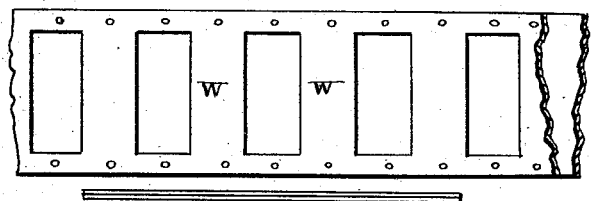

Figure 1 is a vertical section of my invention. Fig. 2 is a longitudinal section of the two belts and the mechanism for moving them. Figs. 3 and 4 are detail views of the mechanism for moving the belts. Figs. 5 and 6 are detail views of the mechanism for causing the belt to move as the streets are approached and passed. Fig. 7 is a plan view of a section of one of the belts.

A represents the road-bed, and B the track upon which the car C is supported. This road-bed is built in the ground below the level of the street, and the standard $a$, upon the top of which the car is secured, extends up through the opening or slot in its top. Placed upon each side of every street that the car passes in its route is a rack, D, which extends sufficiently far out over the top of the track to cause the spur-wheel E to engage with it as the car passes by. There will be a rack placed upon one side of the street just before the car reaches it, so as to cause the mechanism, which will be more fully described hereinafter, to move the belts so as to expose the name of the street, and then after the car has crossed the street will again engage with a second rack placed on the other side of the street, which will again cause the mechanism to move the belts so as to expose an advertisement, which will remain in view until the next street is approached. The wheel E is secured to the vertical shaft F, which is braced in position in any suitable manner, and which has the grooved cam G secured to its upper end. Pivoted to the under side of the car is a lever, H, the inner end of which is provided with friction-rollers I, which catches in the groove of the cam, and to the outer end of this lever is fastened a rope or wire, J, which passes up through the tube K, which acts as a guide. The upper end of this rod, cord, or wire is fastened to a grooved pulley, L, which is placed loosely upon one end of the large roller N. Secured rigidly to this roller N, or formed as a part thereof, is the ratchet-wheel O, with which one or more dogs, P, engage, and which dogs serve to force the roller N partially around each time that the lever is operated by the cam. The pulley L has a suitable weight, Q, secured to it upon one end, so that after the wire or rope has turned the pulley L partially around this weight Q will draw it back into position again as soon as the pulley is free to move, and thus have the dogs P in position ready to move the roller N again.

In order to call the attention of the passengers to the fact that a cross-street is being approached, there are two projections, R, formed upon the outer side of the ratchet O, and one of these projections strikes against the bell-lever S, so as to cause it to strike the bell T, and then, after the street has been crossed and an advertisement has just been or is being exposed to view, the lever is operated so as to again strike the bell and again call the attention of the passengers to the change which has been made by the movement of the belts.

Placed just below or in any other desired relation to the roller N is a second roller, U, and the two rollers are made to revolve together, but in opposite directions, by the spur-wheels V. Around each one of these rollers is placed an endless belt, W, which belts are preferably made of a double thickness, as shown in Fig. 7, and through one of the belts is cut any number of openings, through which will be exposed the names of the streets and the advertisements. Of course these belts and the number of openings through them will be made proportionate to the length of the route over which the car passes, and the mechanism for moving the belts will be graduated accordingly. The belts W are arranged in the relation to each other as shown in Fig. 2, and each one is made to extend down in front of an opening, X, which is made through each end of the top, the side, or any other portion of the car, so that the names of the streets and the advertisements will be exposed to view at each end of the car at the same time. These belts will be preferably arranged in the top part of the car; but I do not limit myself to any precise location, for that may be varied at will. The belts will have the names of the streets and the advertisements placed in the same order, and the belts will then be so arranged as to expose the same names of the streets and the same advertisements at the same time.

Having thus described my invention, I claim—

1. The combination, with a street-car, of an advertising device consisting of a rack, D, placed in the road-bed, a vertical shaft, F, provided with a toothed wheel, E, to engage with the rack, and having an operating-cam, G, secured to its upper end, with a mechanism for operating one or more endless belts, substantially as shown.

2. The combination of the pivoted lever H, an operating mechanism for moving the lever, and a connecting cord, wire, or chain, J, a loose pulley, L, provided with dogs P, a ratchet, R, a roller, N, spur-wheels V, and belts W, substantially as described.

3. The combination of a car having an opening, X, through each end, with the belts W, arranged as shown, and mechanism for operating the belts, whereby the names of the streets and the advertisements will be alternately exposed to view at both ends of the car at the same time, substantially as set forth.

4. The combination, in a street-car, of belts W, a mechanism for operating them, an alarm mechanism to attract the attention of the passengers, a connecting rod, cord, or wire, J, a pivoted lever, H, a grooved cam, G, for operating the lever, a vertical shaft, F, and a toothed wheel, E, and rack D, substantially as specified.

5. The combination of an operating mechanism for advertising in a street-car, consisting of a pivoted lever, H, a connecting wire, cord, or rope, J, the loose pulley L, placed upon the end of the roller N, adapted to operate the belts W, a weight, Q, secured to the pulley L, the dogs P, the ratchet O, the projections R, and an alarm mechanism adapted to call the attention of the passengers to movement of the belts in front of the openings X, substantially as shown and described.

In testimony whereof I affix my signature in presence of two witnesses.

RICHARD FRANCIS BRIDEWELL.

Witnesses:
   JOHN E. HAMILL,
   JOHN WHITE.